Oct. 30, 1923.

A. J. BASTIAN 1,472,147

GEAR WHEEL

Filed July 5, 1919

WITNESSES:
J. A. Helsel
W. H. Woodman.

INVENTOR
Arthur J. Bastian.
BY
Wesley G. Carr
ATTORNEY

Patented Oct. 30, 1923.

1,472,147

UNITED STATES PATENT OFFICE.

ARTHUR J. BASTIAN, OF WILKINSBURG, PENNSYLVANIA, ASSIGNOR TO WESTERN ELECTRIC & MANUFACTURING COMPANY, A CORPORATION OF PENNSYLVANIA.

GEAR WHEEL.

Application filed July 5, 1919. Serial No. 308,731.

*To all whom it may concern:*

Be it known that I, ARTHUR J. BASTIAN, a citizen of the United States, and a resident of Wilkinsburg, in the county of Allegheny and State of Pennsylvania, have invented a new and useful Improvement in Gear Wheels, of which the following is a specification.

My invention relates to gear wheels and other machine elements or hubbed elements and it has, for its primary object, the provision of a gear wheel comprising a self-sustaining working body portion, of fibrous material, and a hardened binder, of improved and superior construction.

Heretofore, gear wheels have been formed by superimposed layers of fibrous sheet material, such as duck or paper, impregnated with a binder, preferably one which may be hardened by the application of heat and pressure, such as a phenolic condensation product. Assembled gear bodies of this character have been cured under heat and pressure, either to the exact shape of the desired gears or in the shape of gear blanks from which the gears have been subsequently milled.

Gears of this character have been very satisfactory, but I have found that a gear wheel or other machine element possessing somewhat greater resiliency than has been previously obtained in the manufacture of such composite gears is very desirable in certain fields of application.

My present invention, therefore, resides in the provision of a gear wheel or other machine element, of composite heat-hardened material, which shall possess unusual resiliency without sacrificing, to any material extent at least, the advantages of strength, hardness and the capacity to resist absorption of moisture and oils possessed by gears of this general type as previously manufactured.

Figure 1:
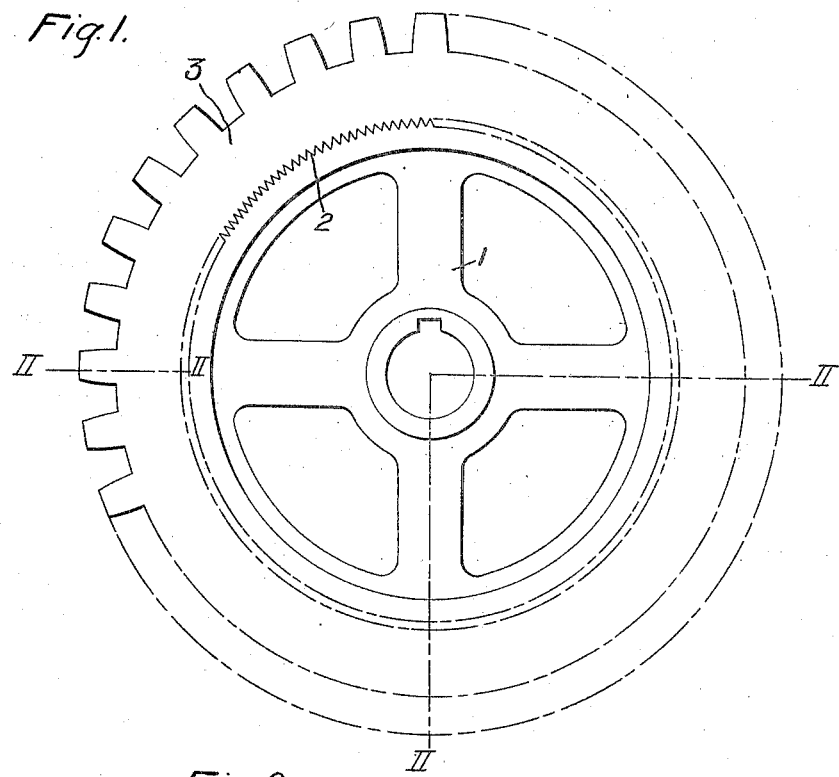
Figure 2:
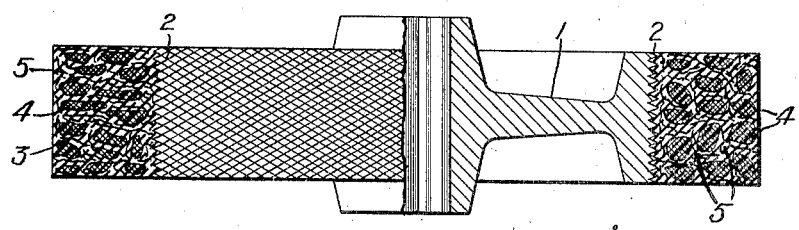
Figure 3:
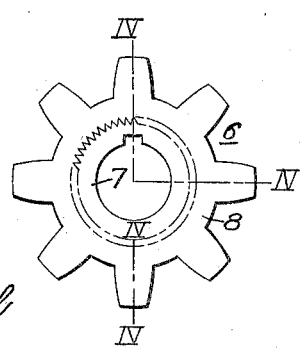
Figure 4:
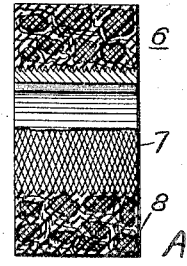

In the accompanying drawing, Fig. 1 is a side elevational view of a spur gear wheel constructed in accordance with my invention; Fig. 2 is a radial sectional view, with parts broken away, of the gear wheel shown in Fig. 1, the section being taken substantially along the lines II—II of Fig. 1; Fig. 3 is a side elevational view of a pinion constructed in accordance with my invention and Fig. 4 is a sectional view taken substantially along the line IV—IV of Fig. 3, with part of the hub in elevation.

In practising my present invention, I may employ any suitable binder such as shellac, copal, or other varnish gum or gum resin, but I preferably employ binders which may be hardened under heat and pressure, such as synthetic resins, as, for example, the well known condensation products of phenols and formaldehyde. With the binders I may employ a composite comminuted or shredded filler of such character as to insure the desired degree of resiliency. For example, I have found that comminuted cloth such as cut-up or shredded duck, together with ground cork provides an extremely satisfactory material.

The binder impregnated material may be molded, by application of heat and pressure, into plates from which gear blanks may be cut and milled to provide the desired gears or the material may be molded to the exact shape of the gears required. The entire gear body may be formed of this material or a gear wheel comprising a central portion, hub or spider of metal and a self-sustaining working body portion or gear-ring of the molding material may be provided. If this latter is the case, the annular working body portion may be molded separately and subsequently mounted upon the hub, but it is preferably molded directly upon the hub in the form of a ring of suitable proportions, in which the teeth may be subsequently cut.

Referring more particularly to Figs. 1 and 2 of the drawings, I have illustrated a spur gear wheel constructed in accordance with my invention. The spur gear wheel may comprise a central part or hub 1 of any desired metal, preferably aluminum, containing, in some instances, a small amount of copper, and the periphery of the hub may be knurled, corrugated, or otherwise roughened as shown at 2. This support or hub may have firmly mounted about it a self-sustaining toothed working body portion or ring 3 of suitable composite material. The gear ring 3 may preferably be molded directly upon the support or hub and may be formed of suitable proportions of shredded or cut-up duck and ground cork, both impregnated with a phenolic condensation product which is hardened, under heat and pressure, during the molding.

The duck or other fabric sheet material may be cut up or otherwise comminuted or divided into pieces of suitable dimensions, which may vary from one-eighth to three-fourths or more of an inch and it may then be impregnated with a binder. For convenience of impregnation, however, I preferably treat the material in sheet form with a binder in solution, dry it to drive off the solvent and afterwards shred, cut or chop it into suitable pieces. The cork employed may also be impregnated in sheet form and then ground, but I prefer to treat ground cork, as it is supplied by the trade, with the binder in solution and later drive off the solvent.

Various proportions of the comminuted duck and cork may be employed, depending upon the desired properties of the finished gear, but, for the majority of conditions, I have found that from 5% to 25% cork and 95% to 75% duck gives satisfactory results, although, in most instances, the cork will vary from 10% to 20% and the duck from 90% to 80%. In Fig. 2 I have conventionally shown the duck shreds at 4 and indicate the cork as at 5.

In Figs. 3 and 4 I have illustrated a pinion 6 constructed in accordance with my invention and comprising a metal hub or bushing 7 and a toothed gear ring 8 comprising a mixture of duck shreds and ground cork impregnated with a heat hardened binder such as a phenolic condensation product. Obviously, my invention is applicable, not only to gear wheels and pinions of all types, but also to pulleys, cams and other machine elements.

By employing the duck in cut-up form and by adding a suitable proportion of ground cork thereto, I have provided a filler which, with a suitable binder, such as a phenolic condensation product, constitutes a moldable composition possessing highly desirable qualities. For example, a gear wheel or other machine element formed of such material is not only hard, strong and highly resistive to moisture and oil absorption, but it is also unusually resilient as compared with gears formed of materials of a like nature previously employed.

Because of this, a gear wheel formed of such material is unusually durable and satisfactory for many purposes as it will absorb or withstand sudden shocks and strains such as are commonly imposed upon gear wheels in use. Furthermore, this added resiliency makes the gear wheel run even more quietly in operation than gear wheels of this character as previously manufactured.

While I have described my invention in considerable detail, and with particular reference to gear wheels, it will be apparent that it is susceptible of numerous changes and that the material employed is suitable for use in the manufacture of a wide range of machine elements and other articles and for these reasons, no limitations are to be imposed upon my invention other than those indicated in the claims.

I claim as my invention:—

1. A moldable material comprising a mixture of small pieces of woven sheet material and ground cork, both impregnated with a binder which may be hardened by the application of heat and pressure.

2. A moldable material comprising a mixture of small pieces of duck and ground cork, both impregnated with a phenolic condensation product.

3. A gear blank comprising a mixture of finely cut-up woven sheet material and cork associated with a heat hardened binder.

4. A gear blank comprising a mixture of shredded duck and ground cork associated with and hardened by a cured phenolic condensation product.

5. A machine element comprising a working body portion of shredded sheet material and ground cork associated with a hardened binder.

6. A gear comprising a working body portion of shredded woven sheet material and ground cork associated with a heat hardened binder.

7. A gear comprising a working body portion of shredded duck and ground cork associated with a phenolic condensation product as a binder.

8. A gear comprising a working body portion of substantially 5% to 25% cork and 95% to 75% shredded duck, both associated with and hardened by a cured phenolic condensation product as a binder.

In testimony whereof, I have hereunto subscribed my name this 27th day of June, 1919.

ARTHUR J. BASTIAN.